United States Patent [19]

Black

[11] Patent Number: 5,387,434
[45] Date of Patent: Feb. 7, 1995

[54] ANTI-GRAFFITI COATING MATERIAL AND METHOD OF USING SAME

[75] Inventor: Robert H. Black, New Rochelle, N.Y.

[73] Assignee: Bat Technologies Inc., Yonkers, N.Y.

[21] Appl. No.: 115,572

[22] Filed: Sep. 1, 1993

[51] Int. Cl.⁶ .............................................. B05D 3/00
[52] U.S. Cl. .................................. 427/154; 427/155; 427/156; 427/352; 427/353; 427/354; 134/4; 134/30; 134/34
[58] Field of Search ............... 106/2, 270, 271, 238, 106/208, 622, 600, 634; 427/154, 155, 156, 352, 353, 354; 134/4, 30, 34

[56] References Cited

U.S. PATENT DOCUMENTS

| | | | |
|---|---|---|---|
| 1,787,338 | 12/1930 | Clapp | 106/622 |
| 2,260,882 | 10/1941 | Berg | 106/208 |
| 3,102,038 | 8/1963 | Fisher | 106/600 |
| 4,315,957 | 2/1982 | Hereth et al. | 427/155 |
| 4,349,586 | 9/1982 | Sejournant | 427/154 |
| 5,049,186 | 9/1991 | Kawabata | 427/155 |
| 5,246,495 | 9/1993 | Helmstetter | 106/2 |

*Primary Examiner*—Mark L. Bell
*Assistant Examiner*—C. M. Bonner
*Attorney, Agent, or Firm*—Bruce L. Adams; Van C. Wilks

[57] ABSTRACT

A method of treating surfaces to facilitate removal of graffiti comprises applying a coating of anti-graffiti material to a surface to form a graffiti barrier on the surface.. The anti-graffiti material is substantially free of organic solvents and comprises a water-based material containing waxes, sodium silicate, rosins, gums or combinations thereof. To remove graffiti applied to the coated surface, the surface is power washed with heated pressurized water having a pressure greater than 250 psi, and preferably in excess of 1000 psi. The surface is power washed, as needed, to remove graffiti, and following each one, two or several power washings, the anti-graffiti material is re-applied to the surface.

15 Claims, No Drawings

ANTI-GRAFFITI COATING MATERIAL AND METHOD OF USING SAME

BACKGROUND OF THE INVENTION

The present invention relates to an anti-graffiti coating material for protecting surfaces of concrete, brick, limestone, slate, wood, metal and the like from graffiti and other markings and to a method of protecting surfaces by treating them with the anti-graffiti coating material.

In recent years, there has been increasing concern over the escalating problem of graffiti. One particular area of concern is the defacing of porous surfaces, such as surfaces of concrete, brick, limestone, slate, wood and masonry. Due to the high porosity of such surfaces, the graffiti is absorbed into the surface to a substantial degree, thereby making it difficult to remove.

As used in the specification and claims, the term "graffiti" means any unwanted painting, drawing, lettering or other marking formed on a surface. Graffiti is typically applied using paints, usually applied by spray cans, or markers. The paints are typically oil-based paints including enamels, epoxies, lacquers and urethanes. The markers are typically color markers having pigmented dyes with fast drying solvents.

In attempting to cope with the graffiti problem, much emphasis has been placed on cleaning techniques for use in treating surfaces to remove graffiti. A common technique is to apply a coating of paint remover, such as methylene chloride, benzene or toluene. After the coating sits for awhile, it is removed by power washing. This process may be repeated two to four times. Any graffiti residue is then removed by sandblasting or sanding, which may require refinishing of the surface to restore it to its former appearance. Another technique for coping with graffiti is to simply repaint the surface, which is disadvantageous because of the time and expense involved. The use of paint removers is disadvantageous and results in the release of harmful vapors which are detrimental to both health and environment. In addition, paint removers tend to soften and remove the underlying paint.

Specialized cleaning compositions have been developed for removing graffiti. Examples of such cleaning compositions are disclosed in U.S. Pat. No. 5,024,780 to Leys. These cleaning compositions are designed for graffiti removal and not as anti-graffiti protective coatings. Anti-graffiti protectants for use as protective coatings have also been developed. These protectants have not proved satisfactory for several reasons: they are not effective against all types and colors of graffiti; they are expensive to manufacture; they are difficult to apply, usually requiring clean, oil-free and dry surfaces; they cannot be applied to painted surfaces; and they are environmentally unfriendly, often having high volatile organic content.

SUMMARY OF THE INVENTION

An object of the present invention is to provide an anti-graffiti coating material which can be applied to protect painted and unpainted surfaces of all types from graffiti and other markings.

Another object of the present invention is to provide an anti-graffiti coating material which is inexpensive to manufacture and environmentally safe in use.

A further object of the present invention is to provide an anti-graffiti coating material which, when applied to a surface, forms a graffiti barrier to protect the underlying surface and which can easily be removed by washing to remove graffiti applied to the surface.

Another object of the present invention is to provide an anti-graffiti coating which is environmentally friendly and which has no, or very low, volatile organic content.

Another object of the present invention is to provide a method of protecting surfaces from graffiti by applying an anti-graffiti coating to the surfaces and, when needed, removing the coating to remove graffiti and then reapplying a fresh anti-graffiti coating.

The above and other objects of the present invention are carried out by an anti-graffiti coating comprised of (a) a member selected from the group consisting of waxes, sodium silicate, rosins and gums, and combinations thereof, and (b) water. The member (a) is present in an amount from 5% to 80% by weight and in an amount effective to form a graffiti barrier on a surface to which the anti-graffiti coating material is applied. Any graffiti applied to the surface is intercepted by the graffiti barrier and can be removed by power washing the anti-graffiti coating with the graffiti from the surface. The power washing is preferably carried out using water at a temperature within the range 120°–194° F. and a pressure greater than 250 psi. A fresh anti-graffiti coating can be reapplied, as needed, to the washed surface.

DETAILED DESCRIPTION OF THE INVENTION

Several examples of anti-graffiti coating materials and methods of using such materials will now be described to enable persons ordinarily skilled in the art to readily understand, make and use the invention.

EXAMPLE 1

Different mixtures of sodium silicate and water were prepared. The sodium silicate was a 42° Baumé solution sold by P. Q., Inc. under the name Type N or Type 0. The sodium silicate was mixed with water in varying proportions from 5% to 80% by weight to obtain anti-graffiti coating solutions.

The anti-graffiti coating solutions were sprayed onto concrete samples. After evaporation of the water, the remaining coating material formed a graffiti barrier on the concrete surfaces without any discoloration of the surfaces. Graffiti in the form of spray can paint and marker was applied to the treated surfaces and allowed to set. The surfaces were then power washed, using pressurized water at a temperature of 165° F. and a pressure of 1000 psi, to completely remove the graffiti without any residue of either the paint or the marker. On other samples, the graffiti was removed using paint remover without any remaining residue of paint or marker.

One drawback of this embodiment is that the anti-graffiti coating is not waterproof and tends to be washed away when exposed to rain. This is due to the fact that the sodium silicate dissolves in water. Thus this embodiment of anti-graffiti coating, while effective to protect against graffiti, is practical only for use indoors, such as on the insides of buildings, or where the surfaces are not exposed to rain.

EXAMPLE 2

To make a waterproof anti-graffiti coating material suitable for use on outdoor surfaces exposed to rain and the like, different waterproofing agents were applied to the anti-graffiti coating. For this purpose, different concrete samples were applied with an anti-graffiti coating material comprised of a sodium silicate and water solution as in Example 1. To the coated concrete samples were applied the following waterproofing agents: latex (both water and solvent based), silicone (both water and solvent based) and wax emulsions.

Tests were run to determine the efficacy of each waterproofing agent as a water repellant on the treated concrete surfaces. The wax emulsions and the solvent-based silicone proved to be the most effective waterproofing agents. It should be noted that these tests were conducted by applying the waterproofing agents onto the surface of the previously applied anti-graffiti coating of sodium silicate and water. Power washing with water at elevated temperature and pressure removed all traces of graffiti.

EXAMPLE 3

To make a more versatile and practical anti-graffiti coating material suitable for outdoor use, it was necessary to formulate a mixture of sodium silicate and wax. While many waxes may be effective as waterproofing agents, they might otherwise be unacceptable because of their tendency to gel the sodium silicate. Unexpectedly good results were obtained using a wax emulsion manufactured by Hercules, Inc. under the tradename Peracol 404C. This wax emulsion is a microcrystalline wax dispersed in water by sodium lignin sulfonate with a gum stabilizer. This dispersing system is non-ionic and is about 48 wt.% wax. The wax has a melting point of 180° F. The microcrystalline wax was mixed with water and sodium silicate, and a stable dispersion was obtained. The dispersion was tested at 140° F. for two months, and no adverse effects (coagulation, separation or discoloration) were discerned. Mixtures were made with varying composition, the sodium silicate varying from 5% to 80% by weight of the mixture, the wax varying from 5% to 80% by weight of the mixture, and water making up the difference in each case. The major restrictions were pumpability, cost and stability. When the weight percent of sodium silicate is too high, the stability of the wax emulsion decreases.

The mixtures of varying composition were sprayed onto concrete samples and allowed to set. The samples were tested for water permeability, and all were acceptably watertight or waterproof. The different mixtures were sprayed onto different concrete masonry samples, which were used because of their high porosity and thus proved to be a highly invasive test medium. All of the samples were allowed to cure for a few days. The samples were then spray painted with black paint and allowed to stand two days to assure drying of the paint. Then all the samples were power washed, and it was found that the graffiti could only be removed at temperatures greater than 100° F. and pressures in excess of 250 psi.

Other wax emulsions were tried, including paraffin waxes dispersed in water by non-ionic dispersants. Other types of waxes, such as slack wax, scale wax and natural waxes, such as carnauba wax and the like, may be used as long as the dispersing systems and the waxes themselves do not gel the sodium silicate. Peracol 404C is preferred because of its high melting point of 180° F., thereby enabling it to withstand the intense summer heat prevalent in many climates. Lower melting point waxes may be used in cooler climates or where the treated surfaces are not subjected to direct sunlight. Wax emulsions were chosen because of their low volatile organic content. It is also possible to use various rosins and gums provided that they and their dispersing systems are stable in and do not gel the sodium silicate.

The various mixtures of sodium silicate, wax and water were sprayed onto various sample surfaces and allowed to dry. The resulting anti-graffiti coatings were clear and had no discernable coloration. The coated surfaces were sprayed with graffiti, using spray can paint, and allowed to dry. At a later date, the samples were power washed, and it was determined that the graffiti could be easily removed at temperatures in the range between 120°-194° F. and pressures greater than 250 psi.

After power washing with water at elevated temperature and pressure, some samples turned white. Upon examination, it was found that the samples that turned white were masonry block that exhibited some previous efflorescence and some brick. To determine whether the whitening was caused by the wax or the sodium silicate, further tests were run in which the concrete samples were applied with either coatings of wax and water or coatings of sodium silicate and water. The samples were dried and spray painted with graffiti. After power washing in the same manner as the previous samples, it was found that the anti-graffiti coatings of wax and water outperformed those of sodium silicate and water and had the additional advantage of not causing whitening of the samples after power washing.

EXAMPLE 4

An anti-graffiti coating material was prepared by mixing 25 wt. % microcrystalline wax dispersed in water by sodium lignin sulfonate with a gum stabilizer (Peracol 404C) and 75 wt. % water. Other wax dispersing systems may be used when wax alone is used to form the graffiti barrier. The mixture was applied to the following samples: precast concrete, masonry, various kinds of bricks, granite, limestone, wood and slate. The anti-graffiti coating was allowed to dry, thereby forming a graffiti barrier on the sample surfaces. Then graffiti was spray-painted onto the surfaces and allowed to dry. The surfaces were then power washed using pressurized water at 194° F. and 1200 psi. The graffiti came off readily in sheets with no traces of any residue. Similar results were obtained using the same anti-graffiti coating material applied with graffiti of acrylic latex, acrylic rubber, alkyd primers and various markers.

To improve the usefulness and versatility of the anti-graffiti coating mixtures, an ultraviolet (UV) blocker may be added to the material. Ultraviolet radiation breaks down the molecular bonds of the wax, thereby making the wax less water repellant. To avoid such UV breakdown, an appropriate UV blocker may be added. For example, sodium silicate may be used as a UV blocker in addition to its role of forming a graffiti barrier. Other UV blockers, such as para amino benzoic acid and derivatives, octyl cinnamate derivatives, benzophenone and ultrafine titanium dioxide powder may be used so long as they are compatible with the wax emulsion and may be mixed in the water phase or the wax and then emulsified. Viscosity builders (rheolocic additives) may be added to obtain thicker, more viscous coatings of the anti-graffiti material. Increased viscosity also improves the sag resistance and reduces running of the applied anti-graffiti material. Coloring agents may also be added to enable the user to cover pre-existing graffiti without using a paint.

In all of the examples and embodiments described above, the amount of the sacrificial material forming the graffiti barrier, that is, the waxes, sodium silicate, rosins and gums, is determined by the porosity and nature of the surface to be treated. For all practical purposes, the amount of such sacrificial material is in the range of 5 wt. % to 80 wt. % based on the total weight of the anti-graffiti coating material. For example, in the case of highly impervious surfaces (i.e., low porosity) susceptible to light graffiti markings, a wt. % near the low end of the range would be suitable, whereas in the case of very porous surfaces susceptible to heavy, extensive graffiti markings, the high end of the range would be suitable.

In carrying out the method of the invention, the anti-graffiti coating material is applied to a surface to be protected, preferably by spraying. As the anti-graffiti coating dries, it forms a removable graffiti barrier on the surface. When graffiti or other markings are applied to the coated surface, they cannot penetrate the graffiti barrier and thus do not reach the underlying surface. It has been found that the anti-graffiti coating sometimes actually disrupts the set of the graffiti, and it is postulated that the coating chemically reacts with the graffiti paint and alters its setting properties. To remove the graffiti, the surface is power washed with pressurized, heated water, as described above.

Depending on the porosity and composition of the surface and the extent of graffiti, it may not be necessary to reapply a fresh coating of anti-graffiti coating material after one, or possibly two or more, power washings. However, a fresh application of anti-graffiti coating material should be applied, as needed, to the surface to preserve the integrity of the graffiti barrier.

The present invention has been described with reference to several preferred examples, though obvious changes and modifications may be made and will be apparent to those skilled in the art. The present invention is not intended to be limited by the specific examples given above but rather by the spirit and scope of the appended claims.

We claim:

1. A method of treating surfaces to facilitate removal of graffiti markings, the method comprising:
   applying a coating of anti-graffiti material to a surface to form thereon a graffiti barrier, the anti-graffiti material being substantially free of organic solvents and comprising water and a member selected from the group consisting of waxes, sodium silicate, rosins, gums and combinations thereof, the member being present in an amount effective to prevent graffiti markings applied to the coated surface from penetrating through the graffiti barrier to the underlying surface; and
   power washing the coated surface, after graffiti markings have been applied thereto, using heated pressurized water having a pressure in excess of 250 psi to remove the graffiti markings from the coated surface.

2. A method according to claim 1; wherein the anti-graffiti material comprises water and wax having a melting point above 100° F.

3. A method according to claim 2; wherein the anti-graffiti material includes an ultraviolet blocker.

4. A method according to claim 3; wherein the ultraviolet blocker is sodium silicate.

5. A method according to claim 1; wherein the anti-graffiti material comprises water and microcrystalline wax.

6. A method according to claim 5; wherein the anti-graffiti material includes an ultraviolet blocker.

7. A method according to claim 6; wherein the ultraviolet blocker is sodium silicate.

8. A method according to claim 7; wherein the anti-graffiti material includes sodium lignin sulfonate as a dispersant.

9. A method according to claim 1; wherein the anti-graffiti material comprises water, sodium silicate and wax.

10. A method according to claim 9; wherein the power washing is carried out at a pressure in excess of 1000 psi.

11. A method according to claim 10; wherein the power washing is carried out at a pressure of about 1200 psi.

12. A method according to claim 10; including repeating the power washing and applying steps, as needed, to remove graffiti markings from the coated surface and maintain a sufficient coating of anti-graffiti material to enable removal of graffiti markings from the coated surface by power washing.

13. A method according to claim 12; wherein two or more power washing steps are carried out between two consecutive applying steps.

14. A method according to claim 1; including repeating the power washing and applying steps, as needed, to remove graffiti markings from the coated surface and maintain a sufficient coating of anti-graffiti material to enable removal of graffiti markings from the coated surface by power washing.

15. A method according to claim 14; wherein two or more power washing steps are carried out between two consecutive applying steps.

* * * * *